United States Patent

[11] 3,584,953

| [72] | Inventor | Osmar Alexander Ullrich, Jr.<br>Columbus, Ohio |
|---|---|---|
| [21] | Appl. No. | 683,988 |
| [22] | Filed | Nov. 17, 1967 |
| [45] | Patented | June 15, 1971 |
| [73] | Assignee | Xerox Corporation<br>Rochester, N.Y.<br>Continuation-in-part of application Ser. No.<br>569,311, Aug. 1, 1966, now abandoned. |

[54] SHORT FOCAL OPTICAL LENGTH SCANNING SYSTEM
8 Claims, 6 Drawing Figs.

[52] U.S. Cl. .................................................. 355/66,
350/167, 353/30
[51] Int. Cl. .................................................. G03b 27/70
[50] Field of Search .......................................... 88/24;
95/75, 73, 53; 355/1, 50, 51, 66; 353/30; 350/167

[56] References Cited
UNITED STATES PATENTS
3,241,438  3/1966  Frank ........................... 88/24

FOREIGN PATENTS
676,947  6/1939  Germany ......................

Primary Examiner—Samuel S. Matthews
Assistant Examiner—Richard A. Wintercorn
Attorneys—Norman E. Schrader, James J. Ralabate and Ronald Zibelli ABSTRACT: An optical system having a plurality of optical imaging devices each with a plurality of optical elements for receiving light rays from an object and projecting them toward an image surface in upright, wrong reading orientation with respect to received orientation for forming a continuous image of the object. The imaging devices can be made to scan an object to project an upright, wrong reading image toward the image surface. In an embodiment of the invention each imaging device includes a pair of reflective surfaces joined at right angles and a refractive lens element arranged in a plane normal to both surfaces. In another embodiment each imaging device includes a refractive element and a porroprism to achieve the desired results.

PATENTED JUN 15 1971 3,584,953

INVENTOR.
OSMAR A. ULLRICH, JR.

SHORT FOCAL OPTICAL LENGTH SCANNING SYSTEM

This application is a continuation of my copending application Ser. No. 569,311 filed Aug. 1, 1966, now abandoned.

The present invention relates to an optical imaging device, and more particularly to an optical scanning system of very short focal length useful for transmitting images of an original document to-be-copied onto a photosensitive surface on which a wrong reading upright light image of the information on the document is formed.

In recent years there has been a tremendous upsurge and growth in the area of office copying machines. In particular, the type of office copying machine which has made the greatest impact as for number of machines in operation and the use thereof has been those based upon the electrostatic theory. Generally, the "electrostatic" copier has been of two forms with respect to the use of photosensitive surface upon which latent electrostatic images are produced. One form utilizes copy paper which has been previously treated with photosensitive chemicals and is directly charged, exposed, developed and fixed to produce a copy of an original.

The other form of most generally used "electrostatic" copier is that which utilizes a reusable photosensitive surface, that is, the copier employs a photosensitive plate such as a drum which is charged, exposed and developed as is customary in the devices. In this form of a copier however, copies of the original are produced on ordinary paper during a transfer step which causes the transfer of a developed powder image from the photosensitive plate to the copy paper.

Both forms of these machines, however, generally employ an optical system for directing image light rays from an original to-be-copied to the photosensitive surface during the exposure step in a copying cycle. The image light rays themselves are produced by scanning an original to-be-copied with an illumination system that moves across the original for illuminating the entire original during a copying cycle. In these copying machines, the conjugate of the optical system is relatively large and therefore requires a relatively large space even with the use of mirrors for folding the system's optical path. For example, for a one to one magnification, some copying machines require a total conjugate as high as 36 inches and more.

Along with the tremendous growth in copying machines there also has been the need for a compact copier of the reflex-dry type which will occupy a small area on an ordinary office desk. Such a copying machine would require an optical system having a relatively short optical conjugate and also, for compactness, an arrangement of a photosensitive surface with the original to-be-copied which will occupy as small a space as possible.

There are many optical devices which require relatively short conjugates so that light images may be transmitted from an original document to a photosensitive surface, wherein both are located very close to each other and with the optical imaging system therebetween. Generally, these devices employ optical imaging systems based upon laminar optics, fiber optics or segmented or cross-cylinders which may be arranged to permit close positioning of an original document relative to a photosensitive surface. However, except for fiber optics, in utilizing optical system of these types in copying machines which produce copy on presensitized copy paper wherein no additional image transfer step is required, the photosensitive surface and the original must be moved relative to the optical system and in the opposite direction relative to each other, thereby necessitating a relatively large area for containing mechanisms which will permit this action.

With the photosensitive surface also being the copy paper, machines utilizing these optical devices generally utilize a paper web moving mechanism which is arranged to move paper web across the optical system at some synchronized rate. For a small compact copier, this would require a mechanism for moving the document in one direction and means for moving the photosensitive surface in the other, the combined length of which would be at least as great as the total length of the two sheets if flat surfaces are used, or a greater than necessary height will be necessary if the original and the photosensitive surface are arranged around support drums.

In utilizing optical systems having short conjugates in copying machines of the "reusable" type, wherein an image transfer step is necessary in the copying process, the optical system must be capable of effecting upright and wrong reading images, which when used to produce the final developed transferred copy results in the production of upright and right reading copy. The above-described optical systems, such as, directly oriented fiber optics, laminar optics and cross-cylindrical optics in present use are incapable of producing such upright and wrong reading images upon reusable photosensitive surface for permitting the transfer of an image therefrom to copy material.

Therefore, it is a principal object of the present invention to improve optical scanning systems by utilizing optical imaging devices which are adapted to present an upright. Wrong reading image upon an image plane.

It is another object of the invention to utilize an optical system suitable for reflex copying which will permit maintaining an object and an image plane fixed relative to one another during scanning by the optical system.

These and other objects and advantages will become apparent to those skilled in the art after reading the following description taken in conjunction with the accompanying drawings wherein.

Figure 1:
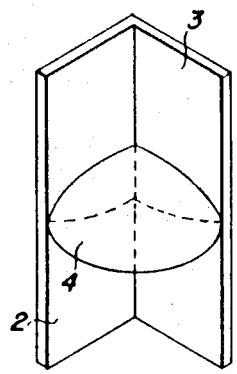
FIG. 1 is an isometric view of a single optical imaging device utilized in the present invention.

Referring now to the drawings, a single optical imaging device 1, shown in FIG. 1, includes a first surface mirror 2 and a second first surface mirror 3 arranged with one of its edges fixed to one of the edges of the mirror 2 in such a way that both reflective surfaces are contiguous and one is 90° relative to the other. A quarter segment of a double convex lens 4 is mounted on both of the mirrors 2 and 3 and is so arranged that the plane of the lens 4 is midway between the ends of the mirrors and normal to both reflective surfaces. As is well known in the art, lenses having surfaces with curvature in more than one direction, as shown, are capable of imaging light rays parallel to their axes to the same point in more than one meridian.

Figure 2:
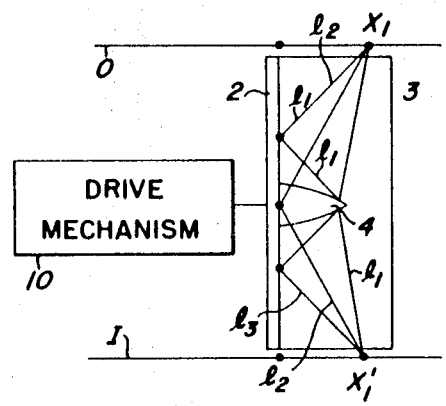
FIG. 2 is a schematic view showing the relation of the object and image planes with the optical imaging device of FIG. 1 arranged therebetween.

In FIG. 2, the optical imaging device 1 is shown in relation to an object plane 0 and an image plane I. For purposes of utilization of the device 1, the plane 0 may be a document to be copied in a copying machine employing the principles of the present invention and the image plane I a flat sheet or plate of photosensitive material which is arranged relative to the plane 0 and the device 1 as to be at the focal plane of the lens 4 and be exposed by light rays emanating from copyable information on the document and transmitted through the imaging device 1. In order to effect scanning motion of the device 1, a reversible constant speed drive mechanism 10 may be connected to the device for imparting a constant scanning motion thereto. It will be apparent that the scanning movement can be easily be accomplished by maintaining the imaging device 1 in a fixed position and moving the object and image planes in synchronism and relative to the device 1.

Figure 3:
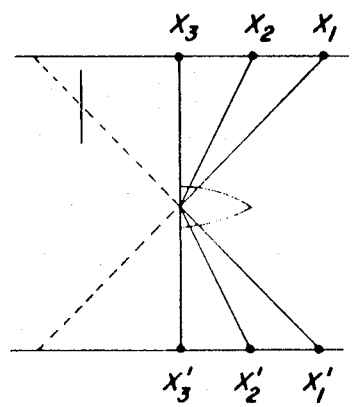
FIG. 3 is a view similar to FIG. 2 showing an optical ray trace path for various points upon the object plane.

As shown by the ray traces in FIGS. 2 and 3, the imaging device 1 is capable of forming an image on the image plane I that is upright and wrong reading. Assuming that a point or elemental object $X_1$ is located equidistant from each of the mirrors 2 and 3 the ray traces $1_1$, $1_2$ and $1_3$ will represent three different paths of light rays of the elemental object $X_1$ from the object plane to the image plane to form an image $X_1$ spaced from the mirrors the same distance that the object $x_1$ is spaced. Similarly, FIG. 3 illustrates a single ray trace from each of three elemental areas $X_1$, $x_2$, $X_3$ for corresponding images $X'_1$, $X'_2$ and $X'_3$. Image formation in this manner is accomplished entirely by refraction of the lens 4 in conjunction with the reflections produced by the mirrors 2 and 3.

Figures 4, 6:
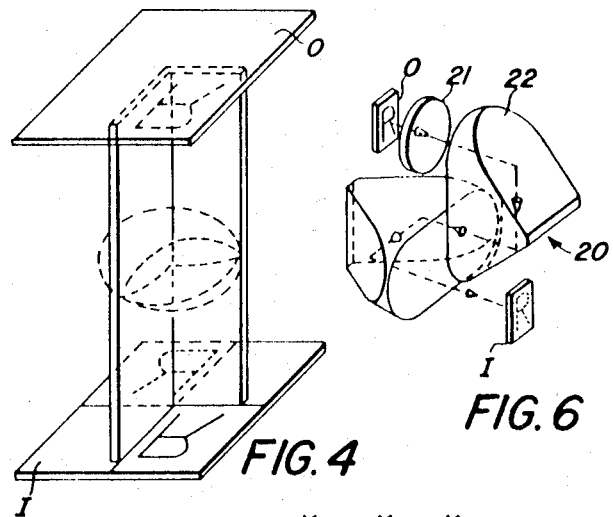
FIG. 4 is a schematic isometric view of the device of FIG. 1 in relation to an image plane and an object plane.
FIG. 6 is another embodiment of an imaging device that may be utilized in the present invention.

As shown in FIG. 4, the composite of the elemental areas of an example in the form of the letter R, will result in an image of the letter R on the image plane I which will be upright and wrong reading. In the event that the Image plane I is in the form of a reusable, electrostatic copying plate such as a xerographic selenium photoconductor plate or drum, the latent image on the plate or drum will be upright and wrong reading so that the powdered developed image will transfer to a sheet of paper as right reading.

Figure 5:
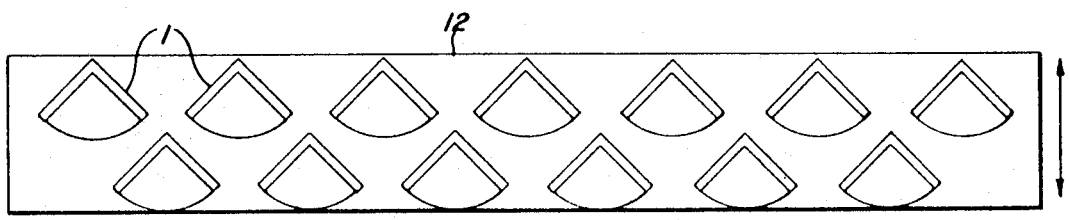
FIG. 5 is a schematic view of a plurality of the optical devices of FIG. 1 oriented in a typical cooperative arrangement useful as a scanning mechanism in a copying machine.

In order to utilize the imaging device 1 as a document scanner, it is preferred that a plurality of devices 1 be utilized, and arranged in a line normal to the direction of movement of the scanning motion as illustrated by the arrows in FIG. 5. As shown in FIG. 5, a plurality of devices 1 are mounted in a supporting frame 12 in two parallel lines and with one row shifted one half the distance between the devices so as to permit the second row to scan the areas of a document lying between the areas being scanned by the first row of devices. In this manner the devices are positioned in such a way that the oblique angles for scanned elemental areas are held to low values. The drive mechanism 10 may be suitable connected to the frame 12 for imparting movement of the imaging devices in the directions as indicated by the arrows. Such movement and direction may be applied to a document and a photosensitive surface arranged in face-to-face relationship and one maintained exactly superimposed over the other for all corresponding points, whether, the document or the photosensitive surfaces are flat or arranged on the parallel related support drums.

The invention may be embodied in other specific forms for the imaging devices 1 without departing from the spirit or essential characteristics of the invention. For example, the device 1 may take the form of the imaging device 20 shown in FIG. 6. The device FIG. 6 comprises a lens element 21 and a porroprism 22 having four reflecting surfaces for inverting and reverting elemental areas of an object, such as the letter R that may be part of a document. The lens 21 is positioned so as to have the image plane I in the focal plane thereof. The resultant image of the letter R as well as all of the elemental areas scanned by the device 20 will be upright and wrong reading.

While the invention has been described with reference to the structure disclosed herein, it is not confined to the details set forth and, this application is intended to cover such modifications or changes as may come within the purposes of the improvements or the scope of the following claims.

What I claim is;

1. An optical imaging system for projecting light images from an object plane to an image plane, said planes being in face-to-face relationship optically for at least portions thereof and fixed optically relative to each other, said imaging system including
   a plurality of optical imaging devices arranged between said planes,
   each of said imaging devices being arranged to scan a discrete portion of the object plane and to project an upright, wrong reading image thereof upon the respective discrete portion of the image plane, each of said imaging devices comprising a pair of reflective surfaces joined together so that the surfaces are at right angles to each other and a refractive lens element arranged in a plane normal to both of said reflective surfaces,
   and drive means for producing relative movement between the imaging system and the object and image planes and arranged to maintain the distance between the imaging system and one of said planes relatively constant during said movement whereby the entire object plane is projected onto the image plane in upright wrong reading relation.

2. The imaging system in accordance with claim 1 wherein said plurality of optical imaging devices are arranged linearly normal to the path of said relative movement.

3. The imaging system in accordance with claim 1 wherein said means is operatively associated with said plurality of imaging devices for moving the same relative to said object and said image planes.

4. The imaging system in accordance with claim 1 wherein said object and image planes are substantially parallel.

5. A copying machine including
   means for supporting an original to-be-copied and a photosensitive surface in the face-to-face relationship optically for at least portions thereof and to maintain one immovable optically relative to the other,
   a plurality of optical imaging devices arranged between the original and said surface, each of said imaging devices comprising a pair of reflective surfaces joined together so that the surfaces are at right angles to each other and a refractive lens element arranged in a plane normal to both of said reflective surfaces,
   each of said imaging devices being arranged to scan a discrete portion of the original and to project an upright, wrong reading image thereof upon the corresponding discrete portion of the photosensitive surface,
   and drive means for producing relative movement between said imaging devices and the original and photosensitive surface and arranged to maintain the distance between the device and the original relatively constant during said movement whereby the entire original is projected onto the photosensitive surface in upright wrong reading relation.

6. An optical imaging system for projecting light images from an object toward an image surface, said object and said image being in optically opposed relationship for at least parts thereof with the optical distance between the parts substantially fixed, said imaging system including
   a plurality of optical imaging devices arranged along corresponding optical paths extending between said object and said image surface each of said optical imaging devices comprising a plurality of optical elements arranged along a common optical path extending between the object and the image surface,
   each of said imaging devices including an optical element capable of imaging light rays parallel to its axis to the same point in more than one meridian, the axis of each of said optical elements lying within a plane which intersects the object and image surface such that corresponding points on said object and image surface are equidistant from said plane,
   each of said optical imaging devices including a plurality of reflective elements on each side of said optical element,
   the optical imaging devices being disposed in laterally adjacent relation so as to receive light rays from contiguous portions of the object and to project them along their corresponding optical paths whereby a continuous image of the portions is projected toward the image surface.

7. An optical imaging system for projecting light images from an object in an object plane toward an image surface in an image plane, the object and the image surface being in optically opposed relationship for at least parts thereof with the optical distance between the parts substantially fixed, the imaging system including
   a plurality of optical imaging devices arranged to receive light rays from the object and to project them toward the image surface, each of the optical imaging devices comprising a plurality of optical means arranged along a common optical path extending between the object and the image surface, each of said imaging devices including an optical means having an axis and a surface capable of imaging light rays parallel to its axis to the same point in more than one meridian, the axis of each of said optical means lying within a first imaginary plane which also intersects the object and image surface whereby corresponding points on said object and image surface are equidistant from said first imaginary plane, the axis of each of said optical means also being transverse with respect to a second imaginary plane which passes between said object plane and said image plane and through said optical means and which is parallel to at least one of said two last mentioned planes, the optical imaging devices being positioned to receive light rays from contiguous portions of the object and to project them toward the image surface whereby a continuous image of the portions is projected toward the image surface.

8. An optical imaging system for projecting light images from an object toward an image surface, the object and the image being in optically opposed relationship for at least parts thereof with the optical distance between the parts substantially fixed, said imaging system including a plurality of optical imaging devices arranged along corresponding optical paths extending between the object and image surface, each of said optical imaging devices comprising a plurality of optical elements including a lens and reflecting members all arranged along a common optical path extending between the object and image surface, the lens of each imaging device lying within a plane which is parallel to at least one of said reflecting members and which intersects the object and image surface such that corresponding points on said object and image surface are equidistant from said plane, each of the imaging devices being arranged to receive light rays from a portion of the object and to project the light rays toward the image surface in upright, wrong reading orientation with respect to the received orientation, the optical imaging devices being disposed in laterally adjacent relation so as to receive light rays from contiguous portions of the object and to project them along their corresponding optical paths, means to produce a scanning movement between the imaging system and the object and image surface, and means to support the object and image surface immovably relative to each other during the scanning movement whereby a continuous image of the object is projected toward the image surface.